Figures 1, 2:
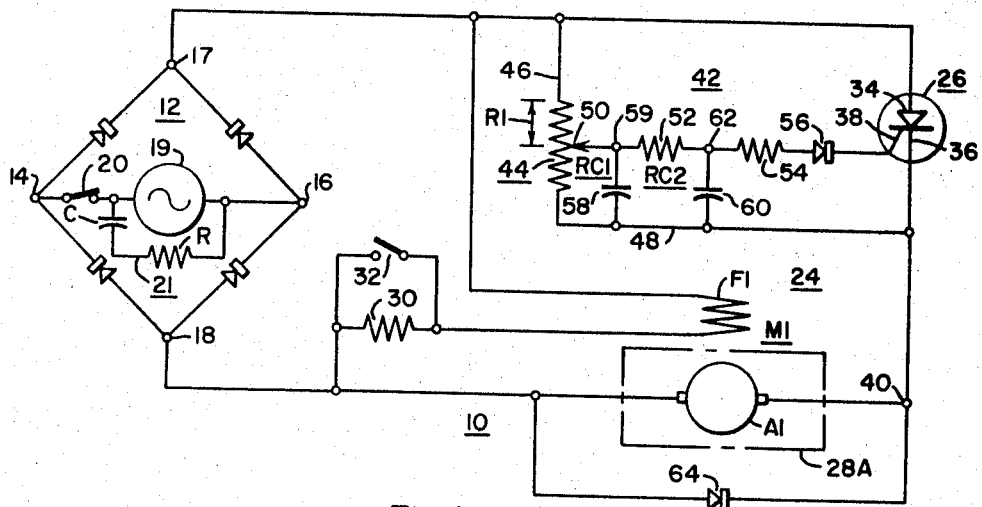

April 25, 1967  J. C. TAYLOR  3,316,472
CONTROL CIRCUIT FOR ELECTRON VALVE IN MOTOR CONTROL SYSTEM
Filed Jan. 31, 1964

WITNESSES:

INVENTOR
Joseph C. Taylor
BY
ATTORNEY

United States Patent Office 3,316,472
Patented Apr. 25, 1967

3,316,472
CONTROL CIRCUIT FOR ELECTRON VALVE IN MOTOR CONTROL SYSTEM
Joseph C. Taylor, Hempfield Township, Irwin, Pa., assignor to Westinghouse Electric Corporation, Pittsburgh, Pa., a corporation of Pennsylvania
Filed Jan. 31, 1964, Ser. No. 341,594
7 Claims. (Cl. 318—331)

This invention relates to speed regulated electric motor systems and more particularly to such a system employing a controlled electric valve, which valve with forward voltage applied thereacross is rendered abruptly conductive in response to the application of a conduction initiating control signal to a control electrode of the valve.

An object of the invention is to provide a novel speed regulating system for electric motors.

Another object is to provide a simple and inexpensive motor system which has a wide range of control.

Another object tis to provide a simple and inexpensive motor speed regulating system.

A further object is a novel speed regulating system having a wide range of control and adapted for use with different types of motors including D.C. shunt, and universal (A.C.-D.C.) motors, etc. D.C. and A.C. are abbreviations for direct current and alternating current, respectively.

A further object is a motor control system having any or all of the above attributes and which provides speed regulation in response to counter electromotive force (C.E.M.F.) of the motor.

Another object of the invention is to provide a motor speed regulating circuit which provides greater torque at low speed for either a D.C. shunt or universal motor.

Yet another object is to provide a novel motor speed regulating system energized by full wave rectified A.C. to take advantage of both halves of the supply wave.

The above objects are obtained in accordance with one embodiment of the invention by a full-wave RAC (rectified A.C.) energized circuit wherein a controlled valve is connected in series with the armature of a motor, and the input of the first of a plurality of cascaded low pass RC circuits of an RC network is connected across the power circuit of the valve, while the output of the last low pass RC circuit of the RC network is connected across the control circuit of the valve. The RC network is adjustable to change the magnitude and phase of its output signal applied to the valve gate. Once operation has been initiated, speed is regulated automatically in response to the effect of the motor counter EMF which operates as a speed feedback signal during the non-conducting times of the valve, thereby to control the firing angle of the valve and regulate the motor speed.

Other and further objects and advantages of the invention will be apparent from the following detailed description taken in connection with the drawings, wherein preferred forms of the invention are shown. In the drawings:

FIGURE 1 is a circuit diagram illustrating the application of the invention to a D.C. shunt motor; and FIG. 2 is a circuit diagram which shows how the circuit of FIG. 1 is applied to a universal (A.C.-D.-C.) motor having series armature and field windings.

Referring now to FIG. 1, there is shown a motor system 10 energized by full wave RAC from a bridge type rectifier 12 having A.C. input terminals 14 and 16 and D.C. output terminals 17 and 18. The input terminals 14 and 16 are connected to a suitable source 19 of alternating current through a switch 20 (shown closed). A network 21 for surge suppression having series resistance R and capacitance C is connected across the A.C. input to the rectifier. As is well known such rectifier arrangement provides at its output terminals successive periodic unipolar voltage waves, each beginning and ending with minimum values and having a higher value intermediate crest.

Connected across the rectifier output terminals 17 and 18 is a series circuit 24 including a controlled rectifier 26 and a motor circuit 28A. In the example of FIG. 1, the motor circuit 28A is the armature A1 of a D.C. shunt motor M1, whose shunt field F1 is connected across the rectifier output terminals 17 and 18, either directly or through a resistor 30 depending upon the position of a shunting switch 32. Additional speed range is provided by inserting resistor 30 into the field circuit.

Valve 26 is provided with power current inlet and power current outlet electrodes 34 and 36, respectively, and a control electrode 38. The control input circuit of a controlled valve includes the control electrode and one of the power current electrodes, while the power or main current path of the valve extends from the power current inlet electrode to the power current outlet electrode.

The valve 26 normally blocks current flow in both forward and reverse directions. However, in response to the application of a control signal of appropriate magnitude and polarity to the control electrode of the valve, while the valve is voltage biased in a particular direction, the main current path of the valve is rendered highly conductive (fired) in the latter direction, generally referred to as the forward direction. Conduction continues until the power current though the valve falls below a predetermined minimum (holding value). Although valve 26 may be any other suitable valve, the system is especially effective with solid state controlled valves, for example the silicon controlled rectifier shown at 26. The respective inlet, outlet and control electrodes of a silicon controlled rectifier are usually referred to as the anode, cathode and gate electrodes, respectively. In silicon controlled rectifiers, the control circuit usually includes the gate and cathode electrodes, while the power circuit or main current path includes the anode and cathode.

With specific regard to silicon controlled rectifiers, forward voltage is applied to them when the anode is made positive relative to the cathode. With the appropriate positive voltage on the anode 34, the controlled valve 26 will be fired (rendered conductive) when the gate electrode 38 has applied thereto a voltage of appropriate polarity and magnitude to forward bias the gate junction. In the example shown, the valve 26 is gated (fired) when positive drive (relative to cathode) is applied to the gate electrode.

The main current or power path of the valve 26 is connected between rectifier output terminal 17 and a junction 40, thus placing it in series with the motor armature A1.

The voltage output of rectifier 12 is a succession of periodic contiguous unipolar half cycles in the forward direction of the valve 26. In the specific example there are two unipolar half cycles of rectifier output for each cycle of input A.C. The speed of motor M1 is adjusted by changing the conduction period of the valve 26 within the respective half cycles of the supply voltage across the valve. To accomplish this the firing angle of valve 26 is varied by changing the magnitude and phase of controlled signals applied to the control electrode 38. Such control signals are provided by a control circuit 42 in the form of an RC network energized by the supply voltage across the valve 26. The control circuit 42 is controllable to vary the phase and magnitude of the control signals supplied by it to the valve gate.

The control circuit 42 includes a plurality of RC circuits connected in cascade, the input of the first being connected across the power circuit or main current path of valve 26, and the output of the last RC circuit being connected across the control input circuit of valve 26. In cascaded circuits, the input of each circuit in the cascade, other than the first, is connected to the output of the circuit preceding it in the cascade. More specifically control circuit 42 includes a voltage divider impedance 44, for example a potentiometer, having one end connected to the rectifier output terminal 17 through a line 46, and the other end connected to junction 40 through the line 48, thus placing the potentiometer in a circuit connected across the power electrodes (anode and cathode) of the valve 26. Since voltage divider 44 is connected through ohmic connections to terminal 17 and junction 40, it is D.C.-coupled between terminal 17 and junction 40, thus providing a D.C. path around the valve 26 through the voltage divider. The potentiometer 44 is provided with a slider or arm 50 for contacting any selected intermediate point or tap on the potentiometer. The arm 50 is connected to the control electrode 38 of the valve 26 through a circuit which includes impedance sections 52 and 54 and an asymmetric current conducting device 56, for example, a semiconductor diode. The impedance elements 44, 52 and 54 are shown by way of example as resistors. Since the exemplary resistors 52 and 54 are capable of passing D.C., they may be described as being "D.C.-passable." An energy storage device for example a capacitor 58 is connected between line 48 and a junction 59 between the arm 50 and resistor 52. Another energy storage device such as a capacitor 60 is connected between the line 48 and a junction 62 between resistors 52 and 54.

Potentiometer 44 and capacitor 58 form a first low pass RC circuit RC1 whose input is across lines 46 and 48, and whose output terminals are the connections 48 and 59 across capacitor 58. Resistor 52 and capacitor 60 form a second, and in this example the last low pass RC circuit RC2 whose input is across line 48 and junction 62, that is, its input is connected across capacitor 58 or the output of the RC circuit RC1. The output of circuit RC2 is across capacitor 60, that is across line 48 and junction 62. Thus the output of circuit RC2 is connected across control electrode 38 and power electrode 36, that is, across the control input circuit of valve 26 through resistor 54 and diode 56. Diode 56 protects the gate junction of valve 26 against damaging reverse currents.

It should be noted that capacitor 58 is in series with that portion of resistor 44 which is between the slider 50 and line 46 thus forming a series RC circuit in the configuration of a low pass RC filter.

An asymmetric current conducting device for example a semiconductor diode 64 is connected across the circuit 28 to discharge the stored energy in the armature A1 during those portions of the half cycle of the supply voltage applied across valve 26 when a conduction initiating signal is not present at the gate electrode 38. As seen in the drawing, diode 64 is oppositely polarized relative to the main current path and the valve 26. This enables the valve 26 to turn off at the end of each half cycle by allowing the current to fall below the holding value.

The magnitude and phase of the signal applied by the control circuit 42 to the control input circuit (gate to cathode) of valve 26 are adjusted by moving the potentiometer slider 46 up or down. Both the magnitude and the output of circuit RC1 across the junction 59 and line 48 depend upon the position of slider 50 which determines the ratio of resistance to capacitance in the circuit RC1. The fundamental component of the output of circuit RC1 across junction 59 and line 48 will be retarded relative to the voltage across lines 46 and 48 by an angle dependent upon the position of slider 50. The output across capacitor 58 (terminal 59 and line 48) is further attenuated and retarded by RC circuit RC2. This further attenuated and retarded voltage appears across capacitor 60 (junction 62—line 48). The voltage applied to gate 38 from the output of circuit RC1 is further attenuated by resistor 54 and the gate impedance of valve 26.

It should be understood that the firing angle (angle at which conduction is initiated) is dependent on both the phase and magnitude of the signal applied to the gate or control input circuit of the valve. Let R1 be the resistance of that portion of potentiometer 44 which is between line 46 and slider 50. If R1 is adjusted to a high value, the valve 26 will not fire and the entire line voltage will be developed across terminal 17 and junction 40. The circuit RC1 will attenuate and retard the fundamental component of the line voltage by about 30° to 40°. The output of circuit RC1 across capacitor 58 is further attenuated and retarded by circuit RC2 so that the voltage of the output of circuit RC2 across capacitor 60 lags the line voltage, for example by 60° to 80°. The output of RC2 is further attenuated by resistor 54 and the gate impedance of valve 26. The resulting voltage is insufficient to fire valve 26 even at its maximum value. Under these conditions, the motor system 10 is in the OFF state with the motor M1 at standstill.

If the arm 50 is now moved upward to reduce the resistance of R1 until valve 26 fires at the crest of one of the voltage half cycles applied to the gate, it will take more than one half cycle of the line voltage for the capacitors to charge sufficiently to fire the valve again. Thus, under these conditions, the valve may fire only on every other half cycle or once per cycle of the A.C. from source 18. Under these circumstances the firing angle might be between 120° and 180°.

However, if slider 50 is further moved to further reduce R1, valve 26 will fire on each half cycle and at an advanced firing angle to further increase the load current and the speed of the motor. Further reduction of R1 will advance the firing angle of valve 26. By sufficiently reducing R1, the firing angle of valve 26 may be so advanced that conduction takes place substantially during the entire period of each half cycle of supply voltage, and the motor operates at its highest speed. Under these conditions substantially the full line voltage is applied to the load.

Once the valve 26 starts conduction, the speed of the motor is regulated by the feedback signal effect of the armature counter E.M.F. The armature voltage is in series with the valve 26, and at light loads the armature voltage will be higher than at heavier loads. As a result the gate voltage under light loads will be less than at heavier loads at a given setting of the intermediate tap 50 of the potentiometer 44. Capacitors 58 and 60 charge from the positive side of rectifier 12 through R1 and 52 down through the armature circuit 28A to the negative side of the rectifier at the beginning of each half cycle of the supply. The capacitors discharge through the valve 26 when it conducts through R1 and resistor 52, thus resetting the capacitors for the beginning of the next half cycle. When a heavy load starts to pull down the motor speed, the induced counter E.M.F. decreases thus increasing the net input voltage across input lines 46 and 48 to the control circuit 42. This increases the magnitude and advances the phase angle of the signal supplied to the gate 38 by the control circuit 42, thus to increase the speed of the motor. The additional current furnished to the motor supplies the necessary torque to handle the increased load. A light load will tend to increase the motor speed as well as the armature counter E.M.F. As a result, the input voltage across lines 46 and 48 is decreased thus increasing the magnitude and retarding the angle of the signal supplied to the control electrode 38. In turn this retards the firing angle of the valve and reduces the voltage supplied to the motor thus maintaining stable operation.

The basic circuit of the invention is equally applicable to a universal motor. For such adaptation the circuit 28a in FIG. 1 is replaced by the circuit 28b of FIG. 2.

Circuit 28b includes a universal (A.C.-D.C.) motor M2 having field and armature windings F2 and A2, respectively. When the circuit of FIG. 1 is used in connection with circuit 28b, the field circuit shown in FIG. 1, and including field F1, resistor 30 and switch 32, are completely eliminated from the circuit, unless a shunt field is desired for compounding effect.

An important advantage of the invention is that it provides a greater torque at low speed for either a D.C. shunt or universal (A.C.-D.C.) motor. Another important advantage is that for either type of motor substantially full range of control is provided across each half cycle of the input A.C. to the system. This is especially important in regard to shunt motors because prior art control circuits generally are ineffective to provide full range of control and are usually limited to half cycle operation.

In one successful operating example of the circuit of FIG. 1, components shown therein have the following values:

| | | |
|---|---|---|
| Potentiometer 44 | ohms | 10,000 |
| Resistor 52 | do | 100 |
| Resistor 54 | do | 100 |
| Capacitor 58 | microfarads | 50 |
| Capacitor 60 | do | 60 |
| Capacitor C | do | 1 |
| Resistor R | ohms | 10 |
| Source 18, 60 cycles | volts | 115 |

While a value of 5 microfarads for capacitor 58 and 50 microfarads for capacitor 60 gave good results with a small motor (about 1/20 horsepower) the system gave excellent results for a wide range of motors (very low to high H.P. ratings), with 50 microfarads for each of capacitors 58 and 60.

From the description herein, it is apparent that the invention provides a relatively simple and inexpensive circuit for effectively providing speed regulation of an electric motor over a wide range.

It is to be understood that the herein described arrangements are simply illustrative of the principles of the invention and that other embodiments and applications are within the spirit and scope of the invention.

I claim as my invention:

1. A motor system comprising a source of periodic successive unipolar waves, said source having first and second output terminals of opposite polarity, a controlled electric valve having a control electrode and first and second power electrodes, which valve with forward voltage applied thereacross is rendered abruptly conductive in the forward direction in response to the application of a conduction initiating control signal to its control electrode, means coupling said first output terminal to said first power electrode, an electric motor including field means and an armature winding, a first circuit including said armature winding connected between said second output terminal and said second power electrode, an asymmetric path connected across said first circuit, said asymmetric path being oppositely polarized relative to said valve, a control circuit for supplying conduction initiating control signals to said control electrode, said control circuit comprising intermediately tapped D.C. passable first resistive means D.C.-coupled between said first output terminal and said second power electrode, D.C.-passable second resistive means having one end D.C.-coupled to an intermediate tap of said first resistive means, the other end of said second resistive means being D.C.-coupled to said control electrode, a first capacitor coupled between said tap and said second power electrode to provide a first RC circuit including said capacitor and said first resistive means and having an output across said capacitor, and a second capacitor coupled between said second power electrode and said other end of the second resistive means to provide a second RC circuit including the second capacitor and the second resistive means, the second RC circuit being interposed between the first RC circuit and said control electrode, said second RC circuit having an output across said second capacitor which is applied across the control electrode and the second power electrode.

2. The combination as in claim 1 wherein said field means includes a field winding, and said first circuit connected between the second output terminal and the second power electrode includes said field and armature windings connected in series.

3. The motor system of claim 1 wherein said source comprises a full-wave A.C. to D.C. rectifier whose output is connected to said output terminals.

4. The combination as in claim 1 wherein said intermediate tap of the D.C.-passable first resistive means is adjustable whereby both the magnitude and phase of said control signal supplied by the control circuit may be varied by adjusting said adjustable tap.

5. The motor system of claim 4 wherein said source comprises a full-wave A.C. to D.C. rectifier whose output is connected to said output terminals.

6. The combination as in claim 1 and further including an asymmetric current device interposed between said control electrode and said other end of the second resistive means.

7. The combination as in claim 5 and further including an asymmetric current device interposed between said control electrode and said other end of the second resistive means.

References Cited by the Examiner

UNITED STATES PATENTS

| | | | |
|---|---|---|---|
| 2,537,677 | 1/1951 | Knauth et al. | 318—345 |
| 2,839,714 | 6/1958 | Mueller | 318—331 |
| 3,165,688 | 1/1965 | Gutzwiller | 318—331 X |
| 3,178,628 | 4/1965 | Van Patten | 318—331 |
| 3,191,112 | 6/1965 | Cain | 318—331 X |
| 3,222,583 | 12/1965 | Gutzwiller | 318—331 X |

OTHER REFERENCES

Meng, "A Full-Wave, Speed Regulating Shunt Wound D.-C. Motor Control," G.E. Application Note 200.25, July 1962, pp. 1–3.

References Cited by the Applicant

"Electronics World," October 1963, p. 30; U.S. Re. 25, 203.

ORIS L. RADER, *Primary Examiner.*

J. C. BERENZWEIG, *Assistant Examiner.*